Jan. 17, 1950     E. S. LEE     2,494,950
GRAVITY FEED ANIMAL FEEDER
Filed Nov. 4, 1944     4 Sheets-Sheet 1
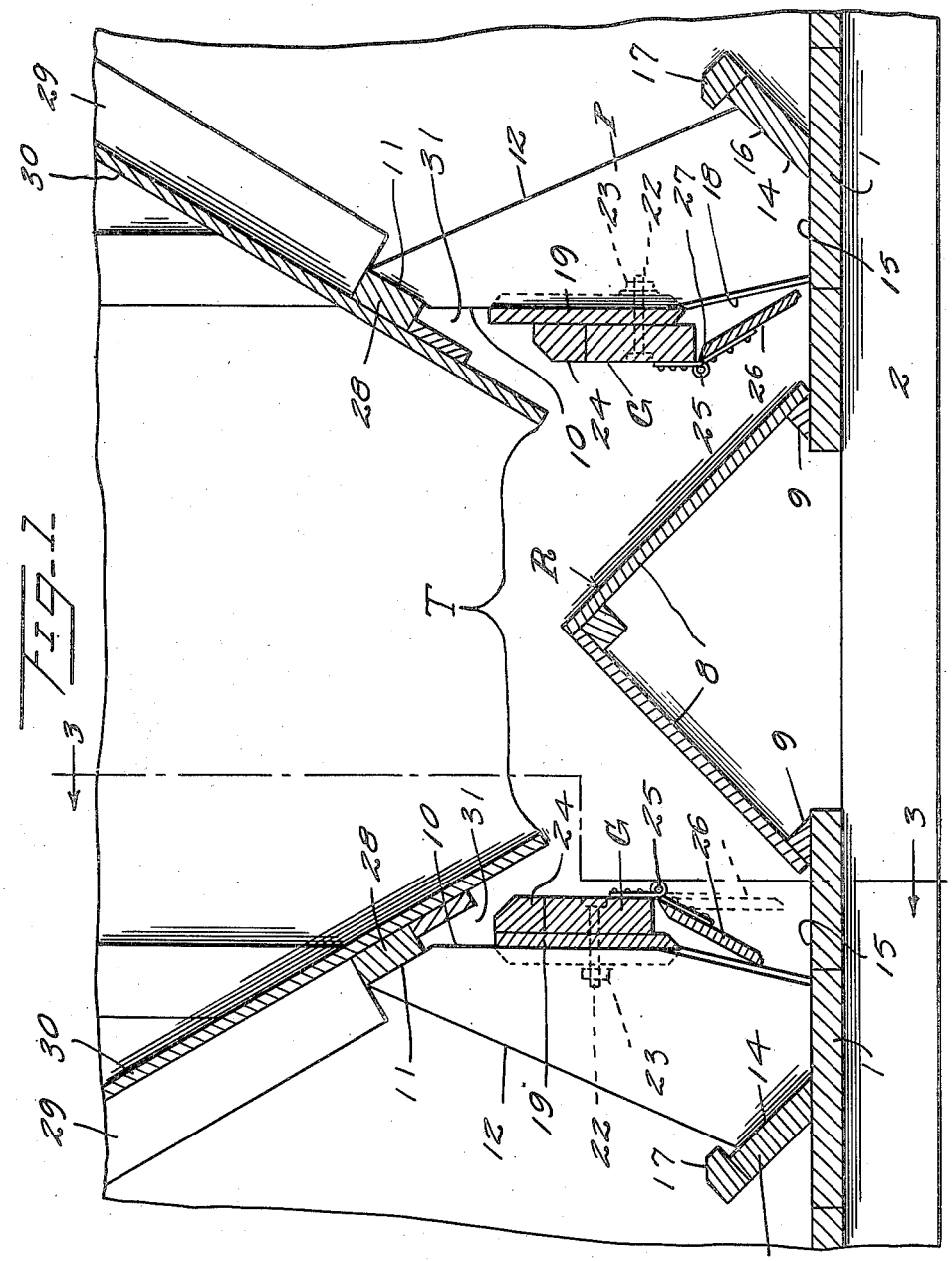
Inventor
Elmer S. Lee
By Wilfred E. Lawson
Attorney

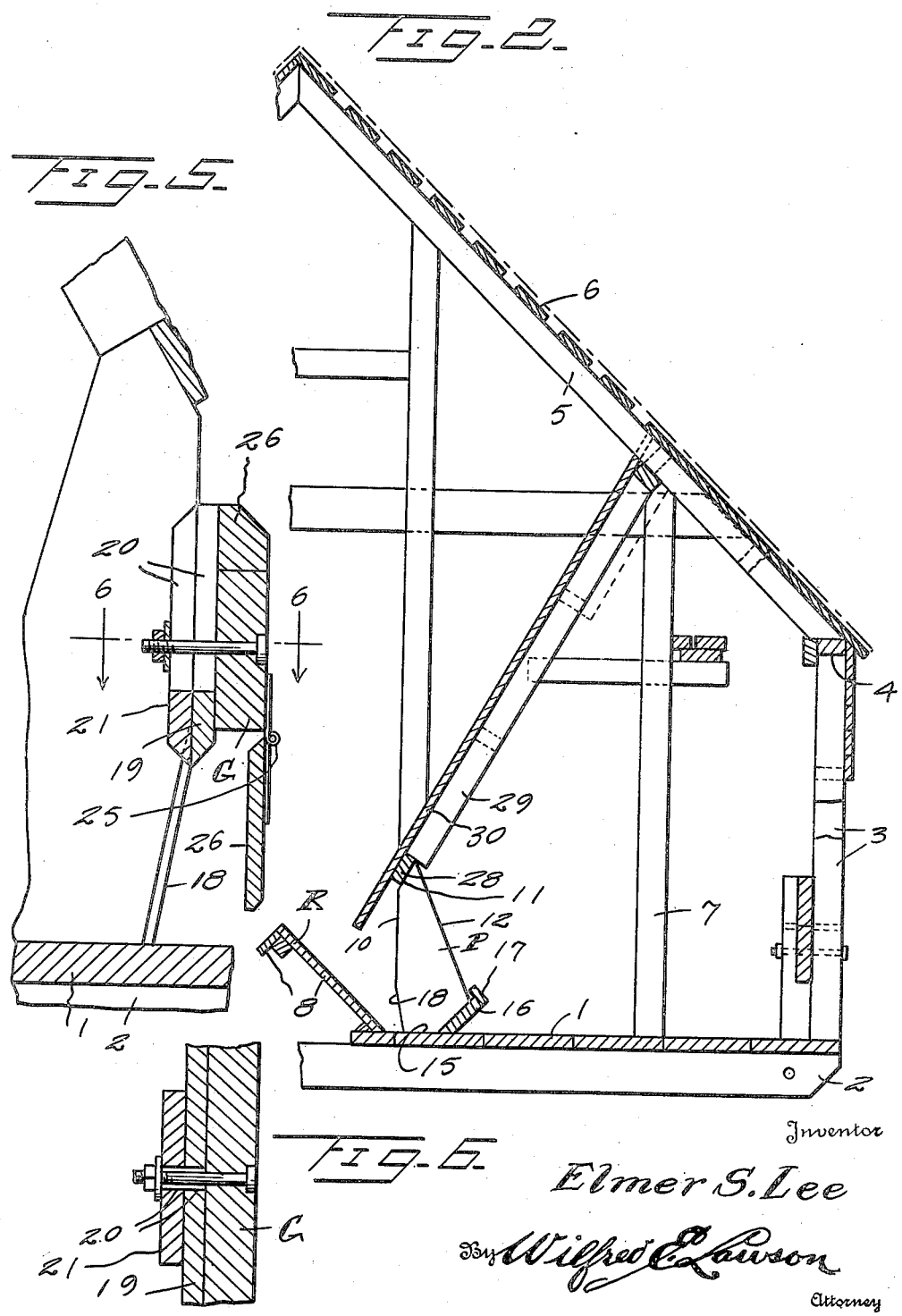

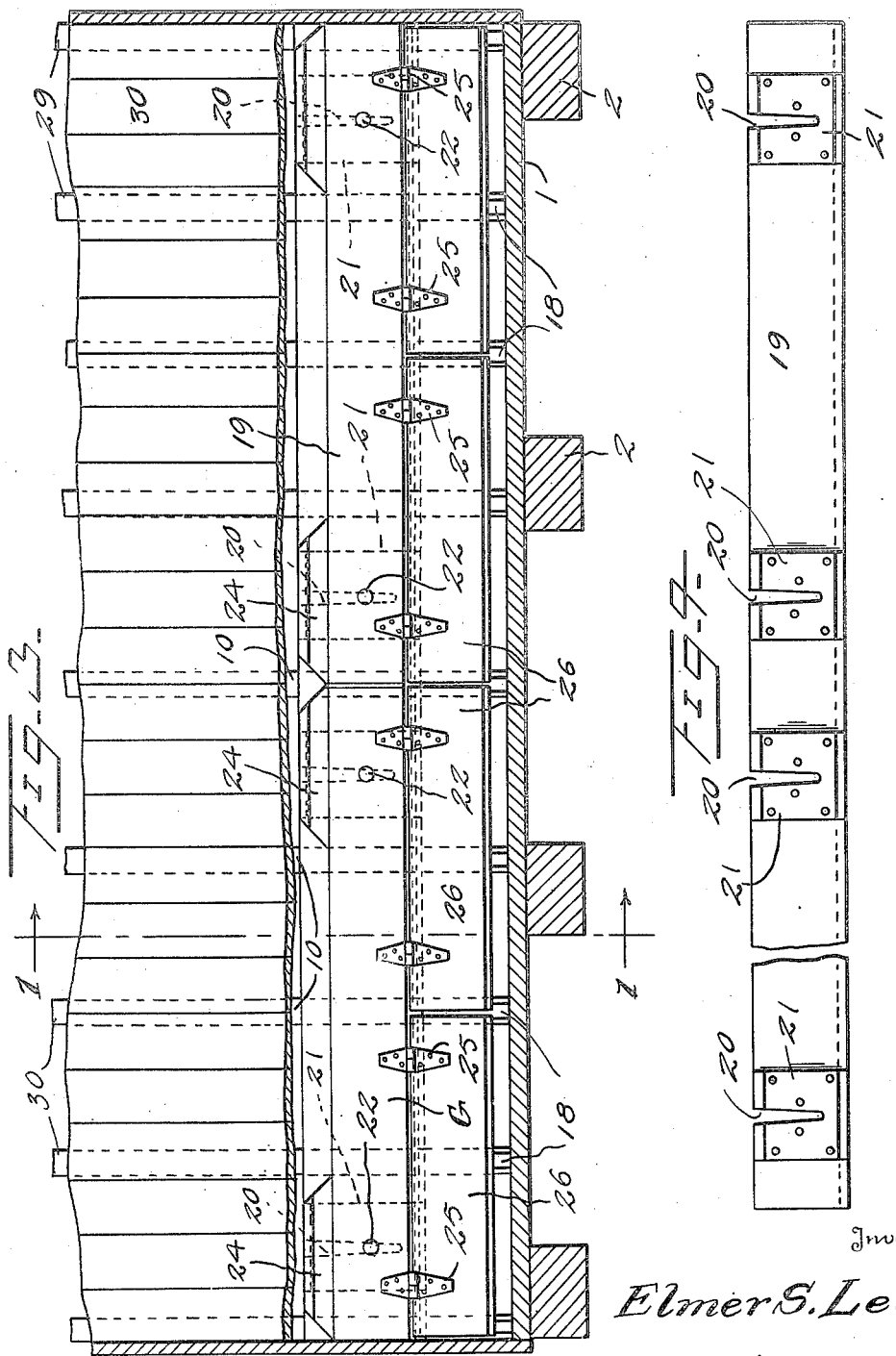

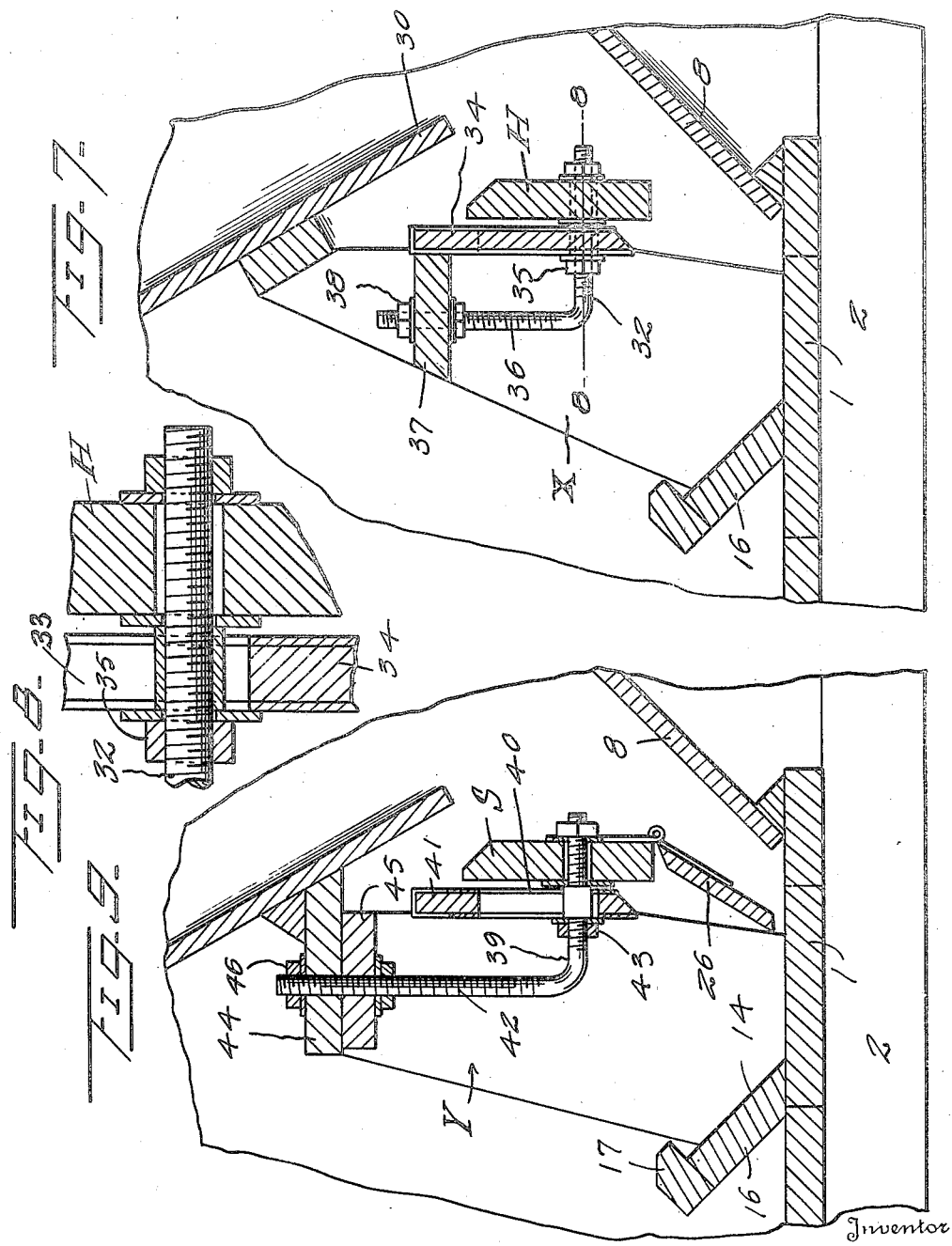

Patented Jan. 17, 1950

2,494,950

UNITED STATES PATENT OFFICE 2,494,950

GRAVITY FEED ANIMAL FEEDER

Elmer S. Lee, Woodbine, Iowa

Application November 4, 1944, Serial No. 561,928

5 Claims. (Cl. 119—53.5)

This invention relates to a gravity feed animal feeder and it is a particular object of the invention to provide a feeder of this kind wherein the delivery of the feed into the feed trough is under control of one or more gates mounted in a manner to permit close adjustment of the gate or gates with respect to the floor of the feeder and wherein the mounting of said gate or gates is such as to provide effective means for agitating the feed under the outside pressure of the animal to assure the desired delivery of the feed to the trough.

Another object of the invention is to provide a feeder of this kind wherein is embodied the use of one or more gates for controlling the delivery of the feed to the feed trough and wherein the mounting for said gate or gates is such as to permit said gate or gates to be normally maintained on an outward slant by the weight of the feed within the device.

A still further object of the invention is to provide a feeder of this kind wherein one or more gates are employed for controlling the delivery of the feed within the device to the feed trough and wherein each of such gates is carried by a hanger bar mounted upon the feed wall of the device in a manner whereby said supporting hanger can be vertically adjusted as desired to assure effective placing of the control gate or gates.

The invention also has for an object to provide a feeder including one or more feed regulating gates carried by a supporting hanger or bar and wherein such hanger or bar is mounted in a manner to allow selective adjustment of the gate or gates with respect to the floor of the feeder irrespective of the pressure of the feed within the device under and against the gate or gates.

The invention consists in the details of construction and in the combination and arrangement of the several parts of my improved gravity feed animal feeder whereby certain important advantages are attained, as will be hereinafter more fully set forth.

In order that my invention may be the better understood, I will now proceed to describe the same with reference to the accompanying drawings, wherein:

Figure 1 is a vertical transverse sectional view taken through the lower central portion of a feeder constructed in accordance with an embodiment of the invention, the section being substantially on the line 1—1 of Figure 3;

Figure 2 is a fragmentary vertical transverse sectional view taken through the feeder with the gates and supporting bar therefor omitted;

Figure 3 is a longitudinal sectional view taken substantially on the line 3—3 of Figure 1;

Figure 4 is an elevational view of a feed wall for the feeder, unapplied;

Figure 5 is a fragmentary view partly in section and partly in elevation illustrating in detail the mounting of a supporting bar with the associated gate free of pressure;

Figure 6 is a detail fragmentary sectional view taken substantially on the line 6—6 of Figure 5;

Figure 7 is a fragmentary vertical sectional view illustrating a further embodiment of the invention;

Figure 8 is an enlarged detail vertical sectional view taken substantially on the line 8—8 of Figure 7; and Figure 9 is a fragmentary vertical sectional view illustrating a still further embodiment of the invention.

In the embodiment of the invention as illustrated in Figures 1 to 6 of the drawings, the floor boards 1 are suitably placed upon the sills 2 and at each corner of the floor is an upstanding post 3. The posts 3 at each side of the floor structure have their upper ends connected by a plate 4 upon which rest the lower extremities of the roof rafters 5 for the roof structure 6. At each end of the floor structure at a desired point inwardly of the adjacent post 3 is a second post 7 bridging the space between the floor and a rafter 5.

The floor structure in the central portion thereof is provided therealong with an upstanding ridge or camel-back R, the walls 8 of which are herein disclosed as in right angular relation. The lower marginal portions of these walls are suitably secured to the nailer strips 9 in required position upon the floor structure.

To each side of the ridge or camel-back R and positioned outwardly therefrom are the upstanding partition posts P herein disclosed as being equidistantly spaced along the floor structure. Each of these posts P is flat and is provided with the rear edge 10, the upper portion of said edge being extended upwardly and outwardly, as at 11, on a predetermined angle.

The outer edge 12 of the post P from the top thereof to a point in relatively close proximity to the bottom of the post is disposed upon a predetermined outward and downward incline, with the lower extremity of such edge 12 cut back to extend downwardly and inwardly, as at 14, on a desired angle with respect to the edge 12. The bottom edge 15 of the post inwardly of the cutback 14 is straight and at right angles to the edge 10. This bottom edge 15 has direct contact with the upper face of the floor and is suitably anchored thereto.

Common to all of the posts P and suitably secured to the cut back edges 14 thereof is the feed box front wall 16. As herein disclosed, this wall 16 has its bottom edge in contact with the floor and extends a slight distance beyond the edges 12 of the posts and the top edge of the wall 16 has secured therealong a cap strip 17 which extends inwardly of the wall 16 to provide means to prevent wastage of the feed within the feed box.

As is clearly illustrated in the accompanying drawings, the lower portion of the rear edge 10 of each of the posts P is formed to have an outwardly and downwardly directed angle, as at 18, said edge portion 18 of each of the posts P having coacting therewith a swinging control gate or gates to be hereinafter referred to.

The posts P immediately above the lower angled edge portions 18 have suitably secured thereto a feed wall 19, such wall being common to all of the posts P. At a point substantially midway of each pair of adjacent posts P, the wall 19 is provided in its upper marginal portion with a V-slot 20 extending a major distance thereacross, and which slots are defined by the outstanding cleats 21.

Overlying the inner face of the feed wall 19 is a plurality of gate hangers or bars G and each of which at its opposite end portions is provided with the transversely extending bolts 22 so spaced apart as to be directed through adjacent slots 20 in the wall 19 and cleats 21. Each of these bolts 22 is of a length to extend outwardly beyond the wall 19 sufficiently to allow the threading thereon of a clamping member or nut 23 whereby the gate hanger or bar G may be effectively maintained in desired selective adjustment relative to the floor of the device as may be determined by the requirements of practice.

By having the slots 20 V-shaped with the apices thereof downwardly disposed, the upward movement of a hanger or bar G upon release of the members or nuts 23 will be materially facilitated and more particularly when it is desired to lift a hanger or bar G.

It has been found of advantage to employ a plurality of such hangers or bars as by this means is facilitated the manual adjustment.

Each end portion of the hanger or bar G has extending upwardly from its top edge a pry block 24 with which a crowbar or other implement may be engaged to move the hanger or bar G downwardly and particularly against the weight of the feed within the device against the gate or gates carried by the hanger or bar G.

Hingedly connected, as at 25, with the inner lower face of each of the hangers or bars G and suspended entirely therebelow are the swinging gates 26 which are supported for free movement and the extent of outward movement of each of these gates 26 is limited by contact of the lower marginal portion of the gate 26 with the lower extremity of the angled edge portions 18 of the associated posts P.

In the assembly, the upper edge of each of the gates 26 is closely adjacent to the lower edge of a hanger or bar G but the upper edge 27 of each of the gates 26 is disposed on an outward and downward bevel to provide proper clearance between the hanger or bar G and the gate 26 and also to readily permit escape or flow of any ground feed which might otherwise interfere with the desired swinging movement of the gate.

It is believed to be readily apparent that the mounting of each of the hangers or bars G is such as to readily permit vertical adjustment thereof so that the gate or gates 26 carried thereby may, if desired, be readily brought to a close adjustment with respect to the floor of the device.

The pressure of the feed within the device will cause the gates 26 to be normally at the limit of their outward swinging movement as determined by contact of the lower marginal portions of these gates with the angled rear edges 18 of the posts P. This normal positioning of the gates 26, however, assures a reduction of the pressure thereon by the feed and thereby allows the gates to provide means for agitating the feed by the pressure on the gates from without by an animal and particularly a little pig. In other words, the gates 26 not only serve to regulate the delivery of the feed to the feed trough but also provide a means for agitating the feed to facilitate such delivery under the action of the animal.

Common to the posts P at each side of the device and resting upon and suitably secured to the upper angled portions 11 of the posts is a post plate 28 and interposed between the plate 28 and the end rafters 5 are the bin studs 29 which provide support for a feed breaker and bin wall 30. This wall 30 is disposed upon a desired downward and inward incline and its lower margin terminates in a vertical plane lying inwardly of the supporting hangers or bars G and such wall 30 serves to effect the desired breaking or loosening of the feed as it passes into the hopper throat T.

Each feed wall 19, as is clearly illustrated in the accompanying drawings, terminates a material distance below the post plate 28 and is spaced from the underside of the wall 30, whereby there is provided a suitable opening 31 for the passage of air to prevent formation of a vacuum which would hold feed from dropping down within the throat of the feeder. Without the provision of this air flow the fine flour, which forms a part of all ground feed material, would sift into and seal the cracks between the boards and other parts of the feeder, thereby making the hopper air-tight and thus developing an undesirable condition.

In the embodiment of the invention as illustrated in Figure 7, each of the opposite end portions of the supporting hanger or bar H for the gates is provided with a threaded shank 32 which extends through a vertically disposed slot 33 in the feed wall 34, and threaded upon this shank 32 and coacting with the adjacent face of the wall 34 is a clamping member or nut 35, whereby the hanger or bar H may be locked in desired selective adjustment.

The outer extremity of the shank 32 is continued by an upstanding threaded rod 36 at right angles to the shank 32 and which has its upper portion freely extended through a block 37 rigidly secured between the upper portions of a pair of adjacent partition posts X. Threaded upon the rod 36 above and below the block 37 for coaction therewith are the threaded members or nuts 38. By proper manipulation of these members or nuts 38, the supporting hanger or bar H may be effectively raised and lowered to bring the hanger or bar, or more particularly the gate or gates carried thereby, into required position with respect to the floor.

In the embodiment of the invention as illustrated in Figure 9, the supporting hanger or bar S for the swinging gate or gates is provided at each end portion with the outwardly directed threaded shank 39 disposed through a suitably positioned slot 40 in the feed wall 41 and continued by the upstanding threaded rod 42. Threaded on the shank 39 is a holding member or nut 43 while the upper portion of the rod 42 is freely extended through a post plate 44 mounted upon the top edge of the partition posts Y and also through a reinforcing plate 45 solidly secured between adjacent posts Y and in close contact from below with the plate 44. Threading upon the rod 42 and coacting with the plate 44 and the reinforcing plate 45 are the members or nuts 46 upon proper manipulation of which the supporting hanger or bar S may be forcibly raised or lowered.

It is to be particularly pointed out that the hanger or bar G extends substantially the full length of the device which makes it more practical and easier to make up and down adjustment as the bolts 22 preferably are only at the extremities of the hanger or bar and thus making it necessary to operate only at two points to accomplish the adjustment.

This vertical adjustment of the hanger or bar G is important because with different kinds of grain it is necessary that the feed gates 26 be selectively spaced with respect to the floor boards 1 in accordance with the particular grain. For whole grain like shelled corn, barley, wheat and oats, the gates 26 do not have to be more than 1¼ to 1½ inches up from the floor boards 1 to feed properly; for ground corn approximately 2½ inches up; for ground oats approximately 3 inches up; and for feed mixtures, such as alfalfa meal with ground oats approximately 4 inches up.

It is also of advantage to have each of the feed gates 26 approximately two feet in length, thus making it easy for a small pig to agitate the same and which agitation, as hereinbefore pointed out, is further facilitated by having the gate 26 always on an angle as determined by contact of the gate with the partition posts under the weight of the feed.

In connection with this particular mounting of the gates 26, the breaker 30 is also of importance because without the breaker 30 and particularly should the gates 26 be straight up and down, the weight of the feed in the feeder would press so heavily against the gate that it would be extremely difficult to move the same but in the present invention the swinging gates 26 are easy to agitate on account of the feed breaker 30 extending out and over so that the weight of the feed above hits at approximately the center of the camel-back R or at a point materially spaced from the feed gates 26.

The feed breaker 30 operates to break up the feed so that it is loose and the breaker further acts to hold the weight of the feed above and off of the feed within the throat. This throat is short and does not hold much feed and, therefore, the weight of the feed within the throat will not cause it to compact and, therefore, as the feed is loose before entering the throat, it will be much easier for the gates 26 to be moved by small pigs to agitate the feed behind the gates.

All ground feed has a lot of fine flour in it and this fine flour seals the cracks of the feeder so as to make it practically air-tight. It is for this reason that the air space or opening 31 is essential. It is also to be pointed out that the air space or opening 31 is of considerable size or area and such a large air space or opening assures good air circulation directly above the feed in the throat and under the feed breaker 30 as the ready escape of heat is permitted and at the same time allowing cool air to enter to mix with the ground feed as it falls or rolls down the camel-back.

It is well known that ground grain starts heating or sweating and in which stage it is warm, damp and sticky and will bridge very easily. By providing air openings or spaces of large area or size, a maximum amount of the ground feed in the throat is exposed to a good air circulation which helps to get the feed in a ripe condition so it will not bridge so easily and also keeps the feed in the throat from reheating.

What is claimed is:

1. In an animal feeder, a floor, a hopper overlying the floor and including an inclined side wall terminating a substantial distance above the floor, a second inclined wall extending upwardly from the floor transversely of and spaced from the lower edge of the wall to provide a feed escape opening, spaced vertical posts supported on the floor and extending upwardly beyond the lower edge of said inclined wall and disposed outwardly a substantial distance beyond the feed escape opening and the lower edge of the inclined wall, a vertical feed wall extending across the inner edges of and secured to said posts and spaced at its top edge from the underside of the inclined wall and spaced at its lower edge a substantial distance above the floor, the vertical plane of the feed wall being a substantial distance outwardly from the feed escape opening beyond the lower edge of the second wall, a feed gate hingedly supported by the feed wall and adapted to swing outwardly away from said feed discharge opening to extend outwardly and downwardly in the same general direction as the second wall, and means for vertically adjusting the feed gate in a plane parallel with the feed wall.

2. An animal feeder of the character stated in claim 1, wherein the said inclined wall has its lower edge directed in a plane passing through the second mentioned wall substantially midway between the top and bottom edges thereof.

3. An animal feeder of the character stated in claim 1, in which the said posts have their inner edges inclined outwardly and downwardly below the lower edge of the feed wall, the gate swinging toward and having its outward movement limited by the said inclined lower edges of the posts.

4. An animal feeder of the character described, comprising a floor, a hopper overlying the floor and including an inclined side wall terminating at its lower edge a substantial distance above the floor, an inclined bottom wall disposed in a plane extending transversely of the inclined wall, the bottom wall being spaced a substantial distance from the lower edge of the inclined wall to provide a feed discharge opening at an elevation below and positioned a substantial distance outwardly from the lower edge of the inclined wall, vertical post members disposed vertically in spaced relation upon the floor at a substantial distance outwardly from the lower edge of said bottom wall and extending upwardly toward the underside of the inclined wall and above the lower edge of the inclined wall, a vertical feed wall supported by and between said posts upon the inner sides thereof, said feed wall being disposed in a vertical plane a substantial distance outwardly from the lower edge of the inclined wall and the lower edge of the bottom wall, the top and bottom edges of the feed wall being spaced respectively from the underside of the inclined wall and from the floor, a member disposed across one vertical face of and connected with the feed wall to be adjusted vertically thereon, a gate hingedly hung from said member to extend downwardly in a plane positioned outwardly from the lower edge of the inclined wall, the gate being swingable outwardly from the bottom wall to assume an angular disposition from the vertical away from said bottom wall, the inner side of the feed wall forming with the lower underside of the inclined wall an upwardly and outwardly opening air passage way.

5. An animal feeder of the character described, comprising a floor, a hopper overlying the floor and including an inclined side wall terminating at its lower edge a substantial distance above the floor, an inclined bottom wall disposed in a plane extending transversely of the inclined wall and having its upper side in spaced opposed relation with the lower edge of said inclined wall to provide a material discharge throat, the lower edge of the bottom wall resting upon the floor on a line positioned a substantial distance outwardly from a vertical plane passing across the lower edge of said inclined side wall, vertical post members disposed in spaced relation upon the floor at a substantial distance outwardly from the lower edge of said inclined side wall and extending upwardly toward the underside of the inclined wall and above the lower edge of the inclined wall, a vertical feed wall supported by and extending across the inner edges of said posts, the top edge of the feed wall being at an elevation in a horizontal plane above the horizontal plane of the bottom edge of the inclined side wall and spaced at its top and bottom edges from the inclined side wall and from the floor, said feed wall having a plurality of vertical slots therein, a bar member disposed lengthwise of and adjacent to one vertical face of the feed wall, threaded members carried by said bar and extending through the feed wall slots, said threaded members being movable in the slots for securing the bar in vertically adjusted position, and a gate hingedly attached to and hung from the bottom edge of said bar for swinging movement, the inner edges of said posts below the feed wall functioning to limit the outward swinging movement of the gate.

ELMER S. LEE.

REFERENCES CITED

The following references are of record in the file of this patent:

UNITED STATES PATENTS

| Number | Name | Date |
|---|---|---|
| 384,357 | Garett | June 12, 1888 |
| 878,086 | Pearson | Feb. 4, 1908 |
| 1,278,583 | Bretz | Sept. 10, 1918 |
| 1,304,107 | Shenk | May 20, 1919 |
| 1,368,553 | Frost | Feb. 15, 1921 |
| 1,383,655 | Morrison | July 25, 1921 |
| 1,488,028 | Scholle | Mar. 25, 1924 |
| 1,507,159 | Cosford | Sept. 2, 1924 |